May 21, 1935.  A. J. ZWIERZINA  2,001,758
CLUTCH MECHANISM
Filed Nov. 22, 1932    2 Sheets-Sheet 1
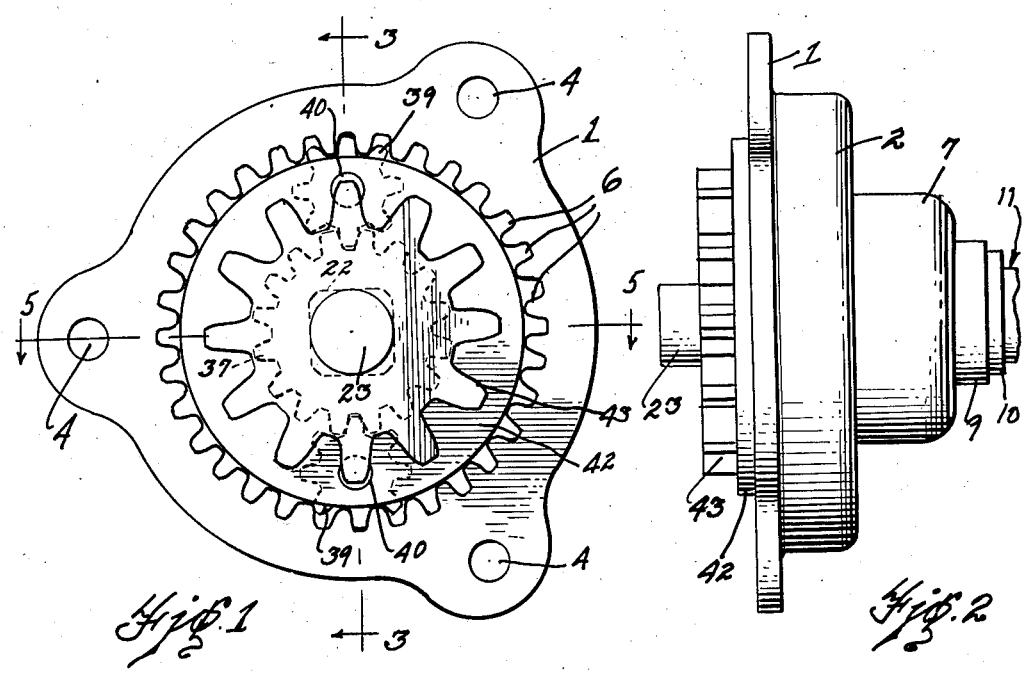
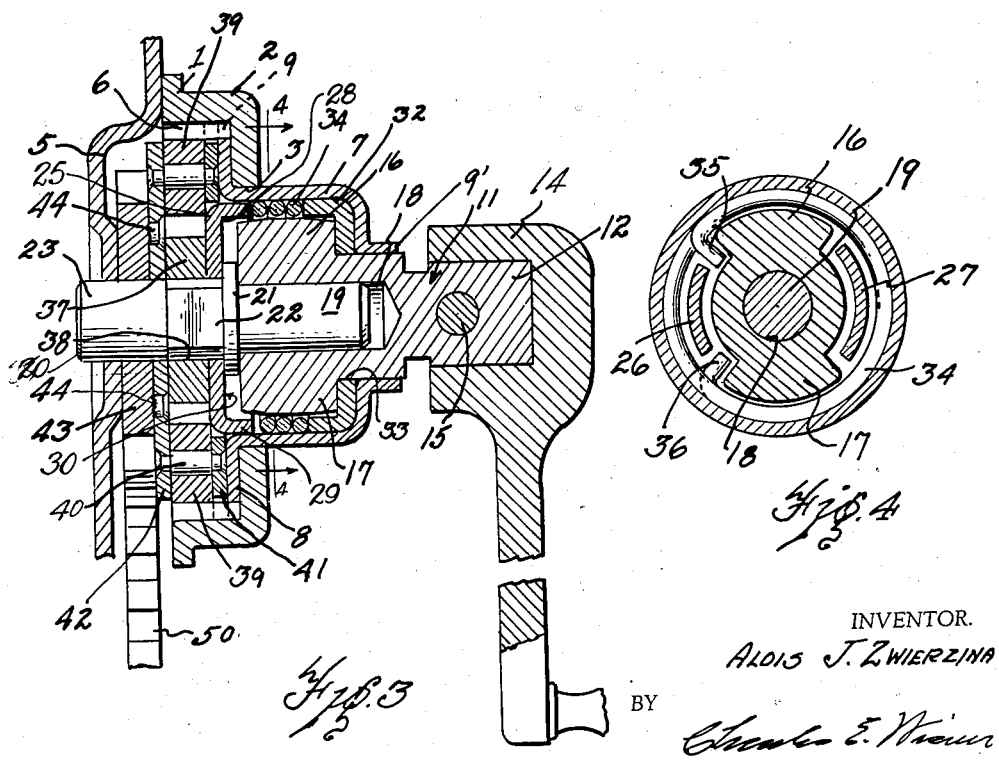
INVENTOR.
ALOIS J. ZWIERZINA
BY
ATTORNEY.

May 21, 1935.  A. J. ZWIERZINA  2,001,758
CLUTCH MECHANISM
Filed Nov. 22, 1932  2 Sheets-Sheet 2
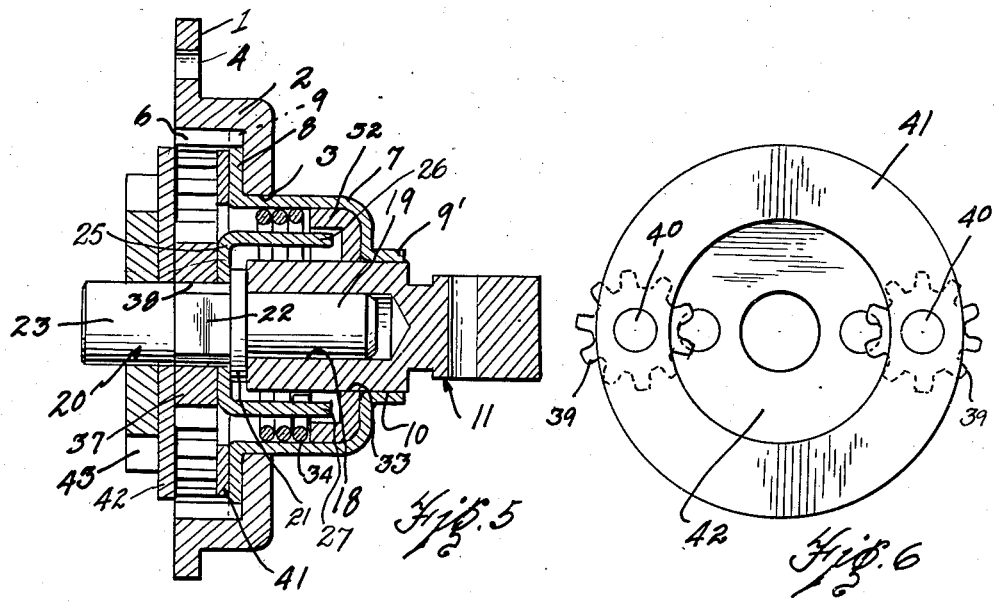
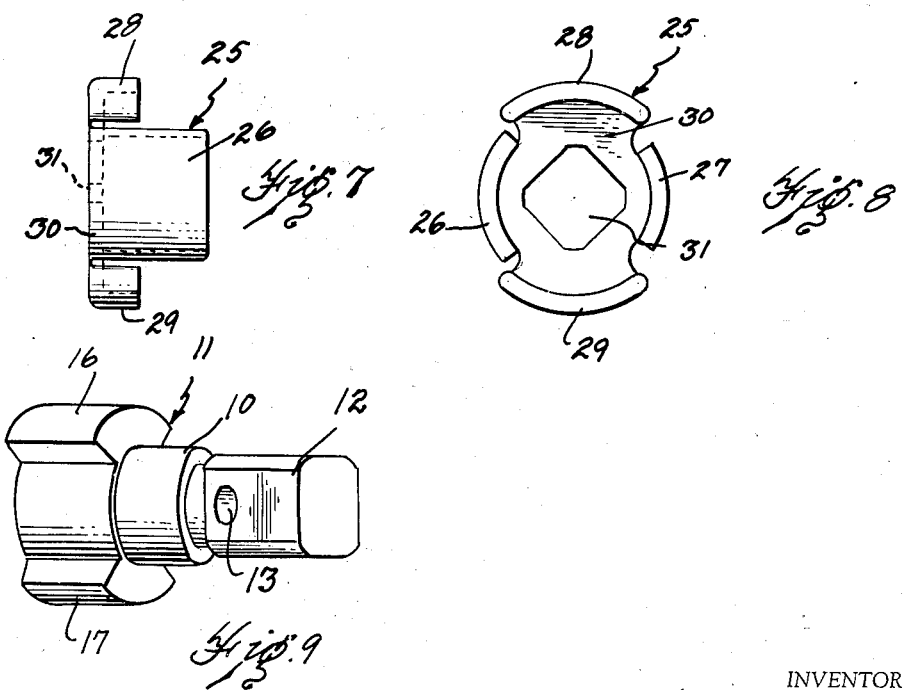
INVENTOR.
ALOIS J. ZWIERZINA
BY
ATTORNEY.

Patented May 21, 1935

2,001,758

UNITED STATES PATENT OFFICE 2,001,758

CLUTCH MECHANISM

Alois J. Zwierzina, Detroit, Mich., assignor to Ackerman-Blaesser-Fezzey, Inc., Detroit, Mich., a corporation of Michigan Application November 22, 1932, Serial No. 643,906

2 Claims. (Cl. 192—8)

This invention relates to clutch mechanism for window regulators and the principal feature of the invention resides in the provision of a device of this character which is so constructed as to reduce the speed between the regulator handle and the driven gear thereby increasing the power applied to the driven gear.

Another object of the invention resides in the provision of a clutch mechanism for a window regulator in which a system of differential gearing is interposed between the regulator handle and the driven gear to reduce the speed of rotation of the driven gear relative to the speed of rotation of the regulator handle thereby increasing the leverage applied to the driven gear.

Another object of the invention resides in the provision of a clutch mechanism in which all of the reduction gearing is self contained in the clutch housing thereby obviating the necessity of securing the reduction gearing to the lock board to which the clutch mechanism is secured.

These objects and the several novel features of the invention are hereinafter more fully described and claimed and the preferred form of construction by which these objects are attained is shown in the accompanying drawings in which—

Fig. 1 is an end view of the device.

Fig. 2 is a side elevational view thereof.

Fig. 3 is a section taken on line 3—3 of Fig. 1 showing the device secured to a lock board.

Fig. 4 is a detail sectional view taken on line 4—4 of Fig. 3.

Fig. 5 is a sectional view taken on line 5—5 of Fig. 1.

Fig. 6 is a detail elevational view of the plate carrying the pinions.

Fig. 7 is a side elevational view of the driven member of the clutch.

Fig. 8 is an end view thereof.

Fig. 9 is a detail perspective view of the driving member of the clutch.

Referring to the drawings, the housing 1 is provided with the depressed portion 2 having an aperture 3 formed in the base thereof and provided with the apertures 4 in the flange thereof for receiving suitable rivets for permitting the housing to be secured to the usual lock board 5. The inner peripheral edge of the depressed portion 2 is formed with the teeth 6 forming an internal gear in the housing 1 for a purpose to be hereinafter described. A cup shaped member 7 extends through the aperture 3 in the housing 1 and is formed with a flange 8, the outer periphery of the same being formed with the teeth 9 for engaging with the teeth 6 thereby preventing rotation of the member 7. The base of the cup shaped member 7 is provided with the bearing portion 9' for closely encircling the cylindrical portion 10 of the driving member 11.

The driving member 11 is formed with the squared end 12 having an aperture 13 therein and the regulator handle 14, which may be of any desired construction, is insertible over the squared portion 12 and is secured thereto by the pin 15 extending through the handle and the aperture 13 in the squared portion 12. The opposite end of the driving member extends into the cup shaped member 7 and is formed with the lugs or segments 16 and 17. The end of the member 11 extending into the cup shaped member 7 is formed with a longitudinally extending bore 18 for closely encircling the cylindrical portion 19 of the member 20, the same being formed with the flange 21, the squared portion 22 and the cylindrical portion 23. The driven member 25 is formed with the oppositely disposed arcuate portions 26 and 27 and the shorter oppositely disposed arcuate portions 28 and 29 and the base 30 of the driven member is formed with the squared aperture 31 of a size to closely fit over the squared portion 22 of the member 20. By referring to Figs. 3 and 5 it will be seen that the base 30 of the driven member 25 abuts the flange 21 on the member 20 thereby preventing longitudinal displacement in one direction of the driven member 25 relative to the member 20. A cup shaped washer 32 is insertible in the member 7 and the base thereof is provided with an aperture 33 for permitting the insertion of the cylindrical portion 10 of the member 11 therethrough.

A helical spring 34 is insertible in the cup shaped member 7 and the ends 35 and 36 are inturned as best illustrated in Fig. 4, and one end coil of the spring is in close juxtaposition to the flange of the cup shaped member 32 while the opposite end coil is in close juxtaposition to the arcuate portions 28 and 29 thereby preventing any appreciable amount of movement of the spring 34 longitudinally of the cup shaped member 7.

Referring to Fig. 4, it will be seen that the end 35 of the spring 34 is inturned and extends between one side edge of the arcuate portion 26 and the adjacent shoulder formed by the lug or segment 16 while the opposite inturned end 36 of the spring extends between the opposite side edge of the arcuate portion 26 and the adjacent shoulder formed by the lug or segment 17. It will be further noted that the distance between one side edge of the arcuate portion 27 and the adjacent shoulder formed by the segments 16 or 17 is so designed as to cause the side edge of the arcuate portion to engage the adjacent shoulder of the segments 16 and 17 and when the member 11 is rotated and the frictional engagement of the spring 34 with the cup shaped member 7 is released. It will thus be noted that the driving action between the driving member 11 and the driven member 25 is not taken by the ends of the spring but is taken by the solid portion of the driving and driven members.

A driving gear 37 is formed with the squared aperture 38 of a size to closely fit over the squared portion 22 of the member 20 and one face thereof closely abuts the base 30 of the driven member 25 and the outer diameter of the gear 37 is considerably smaller than the internal gear formed by the teeth 6 in the housing 1. A pair of pinion gears 39 are each mounted upon a pin 40 extending through and secured to the ring 41 and the plate 42 and by referring to Figs. 3 and 5 it will be seen that the ring 41 is positioned between one face of the pinion 39 and the flange 8 of the cup shaped member 7. By referring more particularly to Figs. 1 and 3 it will be seen that the pinions 39 engage the teeth 6 and the teeth in the gear 37. A driven gear 43 is rotatably mounted upon the cylindrical portion 23 of the member 20 and one face thereof is formed with the projection pins 44 for permitting the gear to be secured to the plate 42 by riveting over the ends of the projections extending through suitable apertures in the plate.

The operation of the device is as follows: Upon rotation of the regulator handle 14 in either direction the spring 34 will be released from frictional engagement with the cup shaped member 7 and will drive the driven member 25 and since the same is mounted upon the squared portion 22 of the member 20 the same will be rotated in the same direction that the handle 14 is rotated and will rotate the driving gear 37 as the same is likewise mounted upon the squared portion 22.

Rotation of the driving gear 37 will impart rotation to the pinions 39 and will cause the same to travel around the teeth 6 in the member 1 thereby rotating the plate 42 and the ring 40 about the longitudinal axis of the member 20 and since the gear 43 is secured to the plate 42 the gear will in turn be driven thereby turning the gear segment 50 to which the regulator arm (not shown) is suitably secured.

It will be noted that due to the difference in diameters of the driving gear 37 and the pinions 39 that the speed of rotation of the pinions 39 about the axis of the member 20 will be considerably less than the speed of rotation of the gear 37 thereby increasing the power or leverage applied to the gear segment 50. It will thus be noted that all of the reduction gearing between the regulator handle 14 and the driven gear 43 is self contained in the clutch housing thereby obviating the necessity of having any reduction gearing secured to the lock board 5. It will be further noted that the device is rugged in construction and is so constructed as to not easily get out of order in operation.

Having thus fully described my invention, its utility and mode of operation, what I claim and desire to secure by Letters Patent of the United States is—

1. A clutch mechanism comprising a housing of L-shaped form in cross section, the peripheral wall of which is internally toothed and the lateral wall of which has a central aperture, a second housing having a body fitting the said aperture and a flange overlying the inner face of the wall of the L-shaped housing, and notched to engage the said teeth thereof, a driving member in the second housing, a driven member having a part extending into the second housing, an expandable coiled spring connected with the said extending part of the driven member and associated with the driving member, said spring normally expanding in frictional contact with the inner wall of the second housing to normally hold the driven member from rotating the driving member and releasable by rotation of the driving member in either direction to thereby drive the driven member, a driving gear in fixed relation with the driven member, a driven gear loosely mounted to turn on the axis of the driving member, a disc to which the driven gear is secured, and pinions on the disc intermediate the driving gear and the internal teeth of the L-shaped housing whereby, through rotation of the driving element, the driven gear is rotated at a less speed.

2. A clutch mechanism comprising a housing of L-shaped form in cross section, the peripheral wall of which is internally toothed and the lateral wall of which has a central aperture, a second housing having a body fitting the said aperture and a flange over-lying the inner face of the wall of the L-shaped housing and notched to engage the said teeth thereof, a driving member in the second housing, a driven member, a spring clutch in the second housing preventing rotation of the driving member by the driven member, said spring clutch being releasable by rotation of the driving member in either direction to drive the driven member, a driving gear in fixed relation with the driven member, a driven gear loosely mounted to turn on the axis of the driving member, a disc to which the driven gear is secured and pinions on the disc intermediate the driving gear and the internal teeth of the L-shaped housing whereby through rotation of the driving member the driven gear is rotated at a slower speed.

ALOIS J. ZWIERZINA.